United States Patent [19]

Varro

[11] 4,050,917
[45] Sept. 27, 1977

[54] PROCESS OF CONVERSION OF SOLID WASTE INTO WORKABLE MATERIAL WITH PREDETERMINED CHARACTERISTICS AND/OR INTO FERTILIZERS OR SOIL IMPROVING AGENTS

[76] Inventor: Stephen Varro, 425 E. 51st St., New York, N.Y. 10022

[21] Appl. No.: 609,697

[22] Filed: Sept. 2, 1975

[30] Foreign Application Priority Data

Aug. 30, 1974 Germany .............................. 2441716

[51] Int. Cl.² .......................................... C05F 11/08
[52] U.S. Cl. ................................. 71/9; 71/14; 71/64 JC
[58] Field of Search ......................... 71/8, 9, 64 JC

[56] References Cited

U.S. PATENT DOCUMENTS

| | | | |
|---|---|---|---|
| 2,043,265 | 6/1936 | Roeder | 71/9 |
| 2,935,387 | 3/1960 | Phillips | 71/63 X |
| 2,954,285 | 9/1960 | Carlsson et al. | 71/64 JC |
| 2,969,277 | 1/1961 | Carlsson et al. | 71/64 JC |
| 3,233,976 | 2/1966 | Varro et al. | 71/9 X |
| 3,451,799 | 6/1969 | Brown | 71/9 |
| 3,853,480 | 12/1974 | Kaelin | 71/9 |

*Primary Examiner*—Frank A. Spear, Jr.
*Assistant Examiner*—Ferris H. Lander
*Attorney, Agent, or Firm*—Staas & Halsey

[57] ABSTRACT

A process for composting waste material by controlling the amount of aeration, the pH value of the moisture content and the temperature of the material during composting. The resulting material has a pH value of approximately 7.3 and a moisture content within the range of 10–30%. The carbon-nitrogen ratio is also controlled to achieve a relative stable composted material as the output product.

3 Claims, 3 Drawing Figures

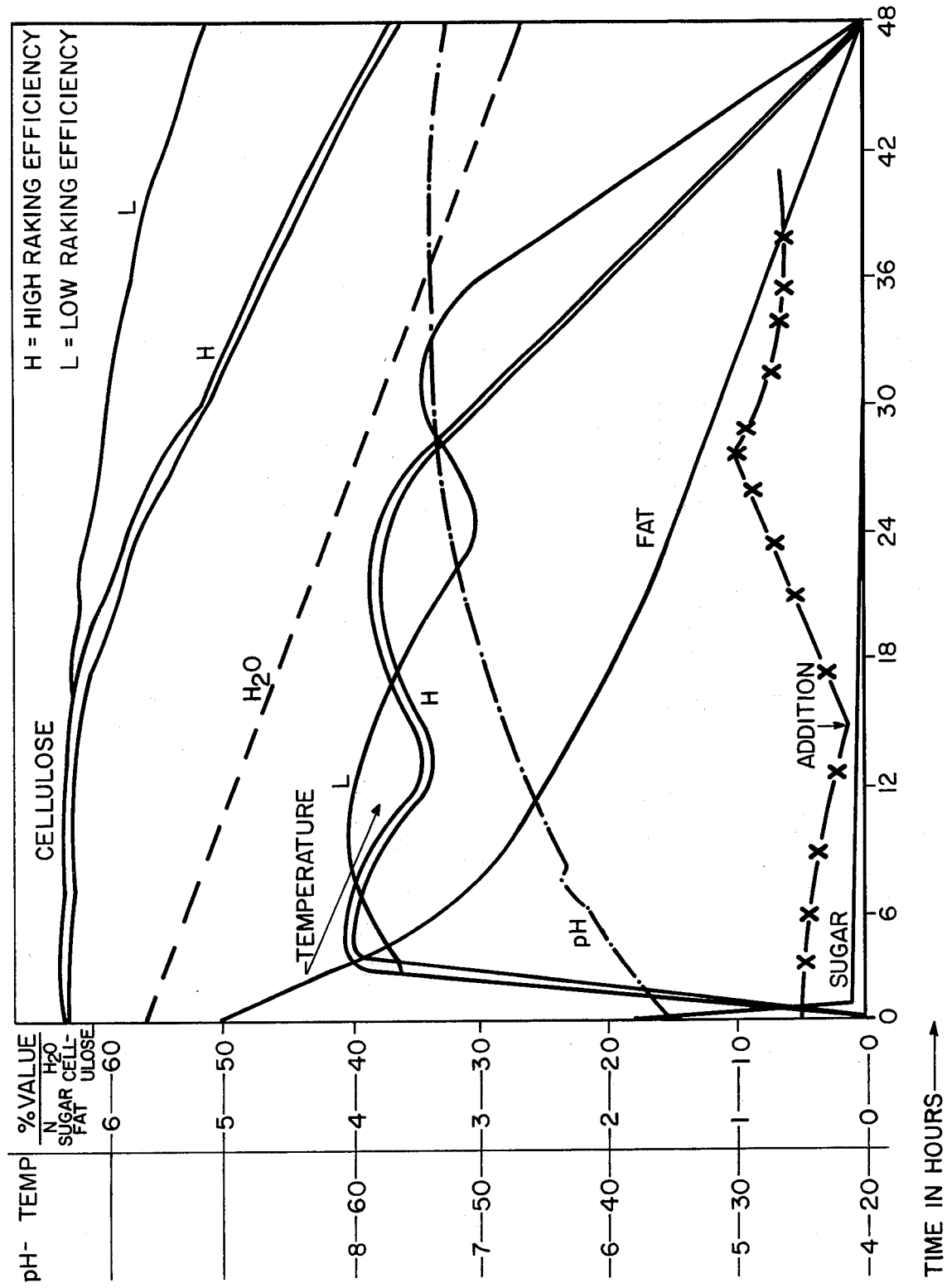

PROCESS OF CONVERSION OF SOLID WASTE INTO WORKABLE MATERIAL WITH PREDETERMINED CHARACTERISTICS AND/OR INTO FERTILIZERS OR SOIL IMPROVING AGENTS

BACKGROUND AND SUMMARY OF THE INVENTION

Solid waste is divided up from various categories, for instance, based on its origin into so-called city waste, industrial waste and agricultural waste, or, based on its combustibility into flammable and non-flammable waste, or, based on its composting capacity, into waste usable or unusable for compost.

Waste materials contain important natural materials which, and this is an economic necessity, should be recycled into the economic cycle, and that either directly, by which the organic materials and minerals are fed into the soil, or indirectly, by using waste materials as replacement for organic materials and minerals which, otherwise, would have to be taken from the soil.

An essential element of the presented invention employs a generally known composting method, namely, biological oxydation of waste material under aerobic conditions.

Aerobic biological oxydation is a process which is dependent on the available quantity of carbon, i.e., of the carbon in the compost mass that is available in a micro-organisms as food and energy supplier. In this composting process the most readily available carbon portions are those from sugars, starch portions, proteins and hemicelluloses, and in this sequence, are, the first to be degraded or broken up. Subsequently, to a certain extent the cellulose is degraded. The Lignines which, in the sense of this invention, offer almost no available carbon to be degraded are of no importance.

We then distinguish, in principle, in the sense of the invention, the so-called available carbon, i.e., carbon that can be used by micro-organisms in the composting process, and such carbon that cannot be used in the biological process.

Several parameters exist that influence and distinguish the composting processes, especially (a) the extent and duration of aeration, (b) the composition of the surface and the particle size of the raw material to be turned into compost, (c) the moisture content of the mass and, finally, (d) the pH-value of the mass to be turned into compost.

The exothermally developing heat of the compost mass and the carbon dioxide production are not established parameters of the oxydation, but they are indicator values of the development of the composting process.

The present invention rests on the recognition that the speed of the composting process, that is the speed of the waste conversion, in other words, the progress from the mesophilic phase to the thermophilic phase and the extent of the composting, namely, the amount of available carbon that is used by micro-organisms, can be controlled only, if each of the above mentioned factors (a), (b), (c), (d) can be influenced individually and independently from each other, throughout the duration of the process.

It is, therefore, the task of the present invention to obtain, by continuous individual control and influence of all factors important for the composting process, a stable, uniform material with predetermined biological, chemical, physical and mechanical characteristics that can be processed further.

This task cannot be solved by the composting processes known up to now.

The so-called Windrow-process, as well as the so-called Batch-process, are already lacking this control possibility because of their uniqueness.

The continuous processes, for instance, those using the slightly slanted horizontal rotating Dano-drums, and those, using the vertically arranged so-called Multibacto-cylinders, permit only the control of the input and output quantities.

The stability of the material, in the Windrow as well as in the Batch processes (the latter are discontinuous processes) cannot be controlled at all; in the continuous flow processes mentioned, the outcoming material must be cured for a longer period of time, before it reaches a somewhat satisfactory stability can be reached.

In creating a stable and uniformly workable material, as set forth in the present invention, three aspects are of great importance. Based on the invention as presented, the uniform quality of the output material is independent from the composition of the incoming waste materials. This is especially important in view of the constantly rising percentage of paper content in city wastes. 15 – 20 years ago, the paper portion in city waste was, in industrialized countries, approximately 25–30%. However, presently that portion is approximately 50%, and in some metropolitan areas is approximately 60% and more. The composting processes mentioned, based on the present state of technology (e.g., Windrow process, Batch process) are only capable of composting waste with a portion of approximately 30% paper. Any amount above this figure must be removed before being put into the system.

In contrast thereto, in the composting of city waste it is, nowadays, a foremost requirement that the compost plant be capable of accepting and transforming the waste in the manner in which it is delivered without regard to composition. The necessity of removing an essential amount of paper from the delivered waste would present an unreasonable burden on the economics of the process.

From public health and economic viewpoints, the major presence of putrescible materials, in the composting mass is a major problem. A radical elimination of all putrescible materials contained therein would only be possible by burning, which not only destroys the putrescible materials, but also destroys the cellulose which is one of the most important natural contents of the waste masses. In contrast, biological oxydation, namely composting, make it possible to clean the cellulose, which can be stabilized, from the putrescible materials.

Such a cleaning can be achieved by adhering to the aforementioned control factors (a), (b), (c), and (d) of the process set forth in the present invention.

Depending on the desired characteristics of the output, optimal combinations of the factors mentioned before are possible and necessary.

If, for instance, the workable compost product is to be used as a carrier in enriched granulated organic fertilizers, the biological characteristics and, especially, the stability, are of the greatest importance, whereas the mechanical characteristics, as, for instance, the size of the particles, are of lesser importance. If, however, the workable composted material is to be used as basis for the manufacture of fiber products (fiber board, etc.), the stability is less important while, in this case, the size of the particle, for instance, the length of the fiber, is the most important factor.

BRIEF DESCRIPTION OF THE DRAWINGS

FIG. 3 is a graphical representation of various controlled factors of the process of the present invention.

DETAILED DESCRIPTION OF THE PREFERRED EMBODIMENT

Figure 1:
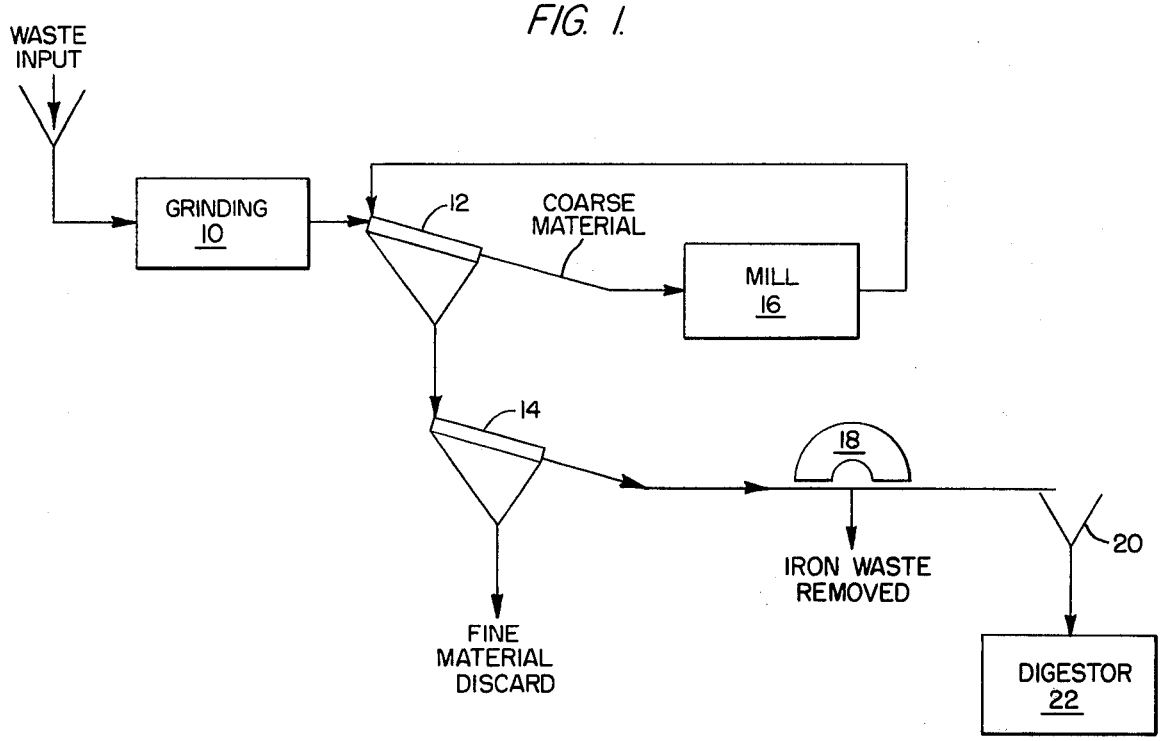
FIG. 1 is a flow diagram illustrating the process of the present invention.

The different steps of the process in the invention are described below in conjunction with the flow diagram illustrated in FIG. 1.

First, of the incoming waste materials that are to be turned into compost are ground in a grinder 10 into smaller pieces which show a maximum screen analysis of 85% through a 20mm screen, of 95% through a 35mm screen, and of 100% through a 75mm screen.

The ground materials typically at this time, have a moisture content of approximately 30-45%, and are conveered through a double deck screen 12-14. The lower limit 14 screen discards fine sand particles, dirt and ground glass materials. The product which is discharged from the upper limit screen cycled through a mill 16 to achieve a better uniformity in view of the 25mm screen size, and is returned to the material input to the screen 12. The resulting mass, from which portions containing iron were removed by a magnet 18, is guided over a storage container 20 to the actual digestor 22.

Figure 2:
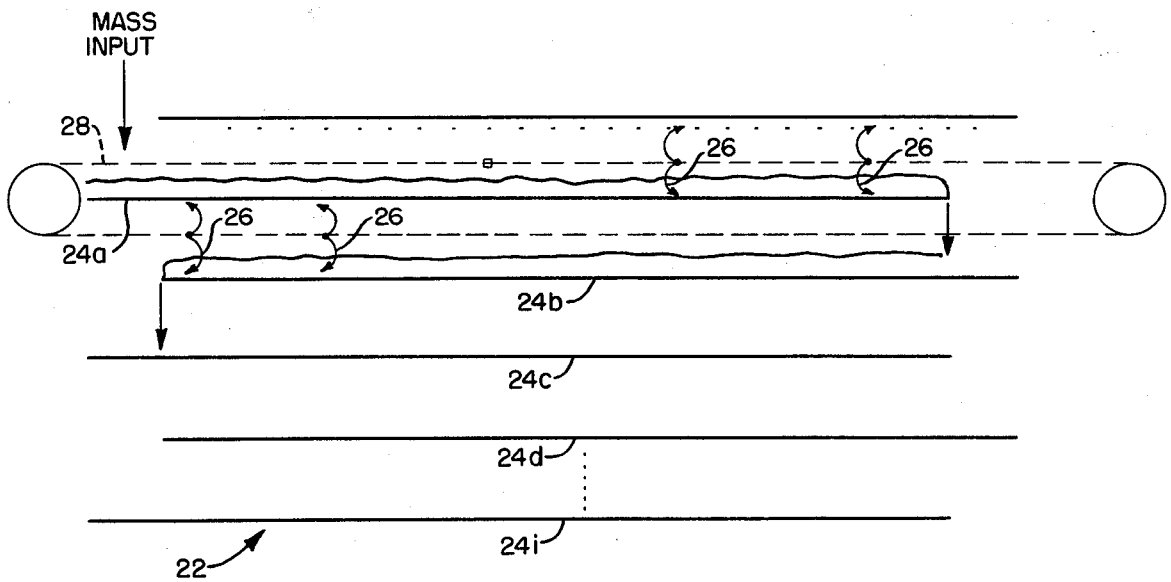
FIG. 2 is a more detailed schematic representation of the digestor shown in FIG. 1.

As is seen in FIG. 2, the mass in the digestor 22, on surfaces 24a . . . 24i that are horizontally stacked in layers of a minimum of 10cm and a maximum of 50cm. Devices like plowshares 26, arranged horizontally and diagonally, are guided, in a longitudinal direction, through the layers of the mass on the surfaces 24a . . . 24i. Since each plowshare device 26 runs longitudinal in the mass, it fulfills two functions: It turns the mass over in furrows and transports it over the stationary surfaces 24a . . . 24i which are called decks. When a plowshare 26 arrives at the longitudinal end of a deck, the transported part of the mass falls down on the next deck. The ratio between the mass quantity that is turned over by the plowshare type device 26 and the quantity which fall from one deck onto the next, is called "rake efficiency".

The extent of aeration (oxygen supply), i.e., the composting factor (a), is a direct function of the extent of the particle surface of the mass exposed to the oxygen of the air. In other words, the composting factor is a function of the rake efficiency and the amount of the treated mass. Therefore, it is possible to regulate the extent of the aeration independent from all other factors, by regulating the rake efficiency.

The independent regulation of the rake efficiency is carried out in two steps. They are:

1. Setting of distances of the plowshare 26 groupings in longitudinal direction on each deck. For example, at a deck length of 48m. various areas can be obtained, by setting up 8 raking elements 26 units at 6m distance from each other, or 6 units at 8m distance from each other, or 4 units at 12m distance from each other; and 2. Increasing or decreasing the distance between plowshares 26 across the deck surface. An increase of one centimeter distance between the plowshares corresponds to an approximate increase of 10cm in the distance of the furrow centers, and about 12cm increase in the conical height of the furrows.

A fine setting, within the limits of each area, is achieved by selectively changing the speed of chains 28, which move the plowshares in a longitudinal direction, using motors of selectively controllable speeds.

The uniform aeration, during the whole transport of the mass to be composted across the decks 24a . . . 24i, is assured by the fact that the positions of the plowshares of the raking arrangements, that follow one another, are off-set from each other so that the whole bed of the composting mass is reached by the ventilation.

The height of the layers of the composting mass on each deck should not be less than 25-30cm, in order to avoid an undesirable loss of the exotherm heat that is created by the biological oxydation. The higher the layers of the composting mass, the more through-put is achieved. The maximum height of the layers is determind by mechanical considerations for example, by limiting torque.

The third independently controlled composting factor (c) is the moisture content. The water content of the incoming waste, is typically between 30 and 45%, and is preferably increased to 50-55% at the feed point at the digestor 22. The water content decreases continuously to a value of preferably 25% at the time of discharge from the digestor 22 by evaporation. As a result of the evaporation of the water, which is approximately 1% per hour, and is the result of the exothermally produced heat, a certain amount of water, is required to be added as evenly as possible to the mass on each deck, especially on the upper deck. Above the each deck, of the digester 22 a sprinkler system is located to allow the even distribution and sprinkling of hot water over the surface of the composting mass. Control devices with Servo-valves, which were preset to certain values, effect an automatic control of the water content. Through the turning over of the mass to be composted, which is effected by the previously mentioned plowshare type elements 26, an even distribution of the added water within the whole mass is assured.

As stated before, it it recommended to use hot water for the purpose of preserving the desired moisture degree, to avoid an undesirable loss of exothermally produced heat within the mass. For the same reason, it is preferable to keep the air temperature in the transforming device approx. 2°-30° C above the temperature of the composting mass. This can, preferably, be achieved by using closed circuits of heated air above each pair of decks, for example, by arrangement of longitudinally set tubes, in which hot water circulates.

These closed heating systems are controlled over thermostates which work together with thermo elements that register the temperature of the composting mass.

To avoid heat loss, the side surfaces, the ground surface and the ceiling of the digestor 22 are heat-insulated, preferably with a material that has a k-factor of a maximum of 0.25. The fourth independent factor of the composting process in the present invention is the pH-control of the mass to be composted.

The

Referring to the graph shown in FIG. 3, the pH-value of the incoming waste lies, in general, on the sour side and amounts to only 4.8–5. In the earlier phase of the biological oxydation the pH-curve in FIG. 3 shows a fluctuating ascendent, whereby those effects in this fluctuation moving the curve downward are mostly connected with the progress of the disintegration of volatile acids. During the change-over of the mass from the mesophilic phase to the thermophilic phase, the pH-curve shows the tendency, in the neutral point (pH7), or somewhat above, to become flat.

Should the pH-value of the incoming material for any reasons, for instance, because the material was, for a too long period of time, that is, for several days, in closed transport vehicles, perhaps locked in trucks, or because of an especially high content of alcaline materials, have reached the value of 7 or surpassed it, or should the pH-value lie, on the other hand, considerably below 5, a correction of the pH-value of the mass is effect in that solutions of chemicals are added by using the water sprinkler system at each desired and predetermined point of the material flow, which will correct the pH-value of the mass. A water solution containing ammonium nitrate and diammonium phosphate is, for this invention, an especially suitable corrective chemical, (1) because of the buffer effect of the diluted solution of these two chemicals and (2) because small variations of the proportion of ammonium nitrate, to diammonium phosphate, on the other hand, effect that each time a very determined pH-range is secured, in other words, by variations of the portions of the two content materials mentioned, that are in the dilute buffer solution, a predetermined desired pH-range within the mass is secured.

Finally, the two aforementioned buffer salts distinguish themselves also for their cheapness. The use of a watery ammonium-nitrate-diammonium-phosphate solution, as utilized in the present invention, has, besides the effects of the pH-control of the composting mass a further influence on the biological characteristics of the materials obtained by the invention, which are subsequently workable, as is shown in the following:

1. In composting the microorganisms utilize part of the available carbon of the mass for energy and the remaining part of available carbon, nitrogen and phosphorus of the composting mass for food. The nitrogen content of the waste materials, which have a low paper content, is generally at 1.5% or somewhat above, while the nitrogen content of the waste materials, with paper contents of over 40% generally, a maximum of 0.4–0.5%.

In the composting of waste materials with a high proportion of paper (these waste materials are usually those that are collected from metropolitan areas) the low nitrogen content of below approx. 1%, is exhausted in the beginning phase of the composting process. At this point, the reduction of the C/N ratio can be achieved only by increasing the nitrogen content of the mass. This can only be achieved by reducing the carbon content of the mass since a large portion of the carbon, which has been available heretofore, has already been used. On the other hand, additional carbon from those components of the mass which contain carbon that is less available, such as for instance hemicelluouses and cellulose, will become available only at a much later time. It is therefore a particularly important characteristic of the process of the present invention, that the point at which the above mentioned ammonium nitrate diammonium phosphates solution is introduced is chosen in such a manner that the reduction of the carbon-nitrogen ratio is also accomplished at any desired point in the composting process. According to the invention the addition of the nitrogen phosphur solution can be effected at any desired point of the flow of the composting material because the sprinkler system is distributed throughout the entire body of the digestor 22.

The graph in FIG. 3 shows the development of the controlled composting factors: moisture content, PH and the addition of nitrogen. Temperature development of the mass is a result of independently controlled aeration. The control of these factors shows the resulting decomposition of cellulous fats and sugars.

2. In the mechanised composting processes known up to now, the adding of nitrogen containing supplements as process controlling materials is only possible at the beginning of the biological oxydation process.

Compared to that, the adding of a nitrogen containing solution at a later time of the composting process, as set forth in this invention, is advantageous, since by incorporating of the added nitrogen in water soluble form into the texture of the micro-organisms, the nitrogen becomes insoluble in water, a situation, which is especially important, if the material derived from the composting process is to be used as carrier for organic fertilizers. Based on the presented invention, this effect is achieved especially by adding high dosages of nitrogen, and that up to 4%, in that area of the composting process, in which the thermophilic phase shows a peak.

The biological oxygen requirement, as well as the chemical oxygen requirement, the disintegration of sugars, the disintegration of fats, the carbon to nitrogen ratio, of water soluble and insoluble materials, as well as the volatile matter, are highly influenced by the constant control of the chemical or biological factors, respectively, and the mechanical factors of the composting process.

The importance of predetermining the characteristics of the output materials from the in the present invented process, was already described above in connection with producing a material that has a maximum stability and therefore then be used as organic fertilizer, or that has minimum stability that can serve as fiber materials for the manufacture of fiber boards and similar building materials.

Therefore, the present composting process can be controlled in such a way that subsequently workable materials can be obtained, the characteristics of which correspond to existing industrial requirements. This, also, was not possible up to now.

A ton of solid city waste produces approximately ½ ton of material that can be composted.

In the process set forth in the present invention, approx. 75–80% of the compostable material can be converted into a subsequently workable output with predetermined biological, physical, chemical and mechanical characteristics. The remaining 20–25% of noncompostable material is cleaned of putrescible components by a generally well established biological method. For example, by using the present process the input materials can be transformed into materials that are no more prone to decay (stable), these materials are then ground up along with the remaining 20–25% into a mechanical consistency, which makes it possible to reincorporate them into the cycle, as per the invention. It is also possible to merely subject them to air separation.

In the above description, all percentages are relative to the weight.

I claim:

1. A process for composting waste material including the following steps:
supplying raw waste material;
grinding said supplied waste material into particles;
extracting said ground particles within a predetermined size range;
extracting iron containing particles from said particles within said predetermined size range;
digesting said particles within said predetermined size range having said iron particles extracted therefrom;
said step of digesting includes the steps of:
exposing said digesting particles to oxygen by raking said digesting particles;
controlling said exposure by controlling the rate of raking;
continually controlling the pH value of said digesting particles by selectively adding a water diluted nitrogen-phosphorous buffer solution having a pH value within the range of 6.2 to 6.8% in order to produce a digested material having a stable pH value of approximately 7.3;
continually controlling the moisture content of said digesting particles according to a linear value of moisture content with respect to time by selectively adding relatively hot water to produce a digested material having a moisture content in the range of from 10–30% by weight;
continually controlling the temperature of said digesting particles within a predetermined temperature range;
advancing said digesting particles over a series of stacked horizontal decks by said step of raking and performing said steps of continually controlling the pH value and continually controlling the moisture content in response to steps of monitoring the pH value and moisture content at a plurality of predetermined locations along said horizontal decks.

2. A process for composting waste material as in claim 1, wherein said step of extracting said ground material particles within a predetermined size range includes the step of extracting particles which are greater in size than the predetermined size range, milling said particles which are greater in size and recycling said milled particles by adding said milled particles to said ground material particles.

3. A process for composting waste material as in claim 1, wherein said step of controlling the temperature is performed by monitoring the air temperature at a plurality of predetermined positions and maintaining said air temperature at said monitored positions within a range of 2°–3° above the temperature of the digesting particles at that position.

* * * * *